(12) United States Patent
Shimizu et al.

(10) Patent No.: US 8,571,386 B2
(45) Date of Patent: Oct. 29, 2013

(54) MOTION BLUR CORRECTION DEVICE AND MOTION BLUR CORRECTION METHOD

(75) Inventors: Hiroshi Shimizu, Akishima (JP); Jun Muraki, Hamura (JP); Hiroyuki Hoshino, Ome (JP); Erina Ichikawa, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 134 days.

(21) Appl. No.: 13/232,223

(22) Filed: Sep. 14, 2011

(65) Prior Publication Data

US 2012/0069204 A1 Mar. 22, 2012

(30) Foreign Application Priority Data

Sep. 16, 2010 (JP) ................. 2010-208183

(51) Int. Cl.
H04N 9/88 (2006.01)
H04N 9/885 (2006.01)
H04N 5/228 (2006.01)
H04N 5/235 (2006.01)

(52) U.S. Cl.
USPC ........... 386/263; 386/264; 386/267; 386/271; 348/208.4; 348/222.1

(58) Field of Classification Search
USPC ........... 348/154, 155, 208.4, 222.1; 386/263, 386/264, 267, 271
See application file for complete search history.

(56) References Cited

U.S. PATENT DOCUMENTS

| 7,742,647 B2 | 6/2010 | Shimizu |
| 2009/0059031 A1* | 3/2009 | Miyakoshi ................. 348/222.1 |
| 2009/0315875 A1* | 12/2009 | Kuroki .......................... 345/213 |
| 2010/0157090 A1* | 6/2010 | Kobayashi et al. ........ 348/222.1 |

FOREIGN PATENT DOCUMENTS

| JP | 05-091396 A | 4/1993 |
| JP | 2000-023024 A | 1/2000 |
| JP | 2001-024932 A | 1/2001 |
| JP | 2006-287629 A | 10/2006 |
| JP | 2007-122232 A | 5/2007 |
| JP | 2007-158432 A | 6/2007 |
| JP | 2007-274031 A | 10/2007 |

OTHER PUBLICATIONS

Japanese Office Action dated Dec. 17, 2012 (and English translation thereof) in counterpart Japanese Application No. 2010-208183.

* cited by examiner

*Primary Examiner* — Daquan Zhao
(74) *Attorney, Agent, or Firm* — Holtz, Holtz, Goodman & Chick, PC

(57) ABSTRACT

A motion blur correction device includes a motion blur correction section which performs motion blur correction processing on an intended video data, and a correction intensity judgment section which instructs the motion blur correction section to cancel the execution of the motion blur correction processing when the frame rate of the video data is equal to or less than a predetermined value. As a result, motion blur correction is prevented from being automatically performed when motion blur correction is not required.

10 Claims, 7 Drawing Sheets

FIG. 2

|  | PLAYBACK FRAME RATE | | | | | |
|---|---|---|---|---|---|---|
|  | 5fps | 10fps | 15fps | 30fps | 60fps | 120fps |
| IMAGING FRAME RATE 30fps | OFF | ON | ON | ON | OFF | OFF |

LOW-SPEED PLAYBACK — NORMAL-SPEED PLAYBACK — HIGH-SPEED PLAYBACK

| OFF | MOTION BLUR CORRECTION NOT REQUIRED | ON | MOTION BLUR CORRECTION REQUIRED |

| | | PLAYBACK FRAME RATE | | | | | |
|---|---|---|---|---|---|---|---|
| | | 5fps | 10fps | 15fps | 30fps | 60fps | 120fps |
| IMAGING FRAME RATE | 30fps | OFF | ON | ON | ON | OFF | OFF |
| | 60fps | OFF | OFF | ON | ON | ON | OFF |
| | 120fps | OFF | OFF | OFF | ON | ON | ON |
| | 240fps | OFF | OFF | OFF | OFF | ON | ON |
| | 480fps | OFF | OFF | OFF | OFF | OFF | ON |

OFF MOTION BLUR CORRECTION NOT REQUIRED

ON MOTION BLUR CORRECTION REQUIRED

FIG. 5

| | | PLAYBACK FRAME RATE | | | | | |
|---|---|---|---|---|---|---|---|
| | | 5fps | 10fps | 15fps | 30fps | 60fps | 240fps |
| IMAGING FRAME RATE | 30fps | 40% | 60% | 80% | 100% | 100% | 100% |
| | 60fps | 20% | 40% | 60% | 80% | 100% | 100% |
| | 120fps | 0% | 20% | 40% | 60% | 80% | 100% |
| | 240fps | 0% | 0% | 20% | 40% | 60% | 80% |
| | 480fps | 0% | 0% | 0% | 20% | 40% | 60% |

0%~100%: INTENSITY OF MOTION BLUR CORRECTION

0% MINIMUM (EQUIVALENT TO MOTION BLUR CORRECTION NOT BEING PERFORMED)
100% MAXIMUM

| FRAME RATE RATIO | INTENSITY OF MOTION BLUR CORRECTION |
|---|---|
| 10% | 0% |
| 20% | 20% |
| 30% | 50% |
| 50% | 80% |
| 100% | 100% |
| 200% | 100% |

FRAME RATE RATIO : RATIO OF PLAYBACK FRAME RATE TO IMAGING FRAME RATE

PRIOR ART

MOTION BLUR CORRECTION DEVICE AND MOTION BLUR CORRECTION METHOD

CROSS-REFERENCE TO RELATED APPLICATION

This application is based upon and claims the benefit of priority from the prior Japanese Patent Application No. 2010-208183, filed Sep. 16, 2010, the entire contents of which is incorporated herein by reference.

BACKGROUND OF THE INVENTION

1. Field of the Invention

The present invention relates to a motion blur correction device and a motion blur correction method. In particular, the present invention relates to a motion blur correction device and a motion blur correction method by which motion blur correction can be performed during the playback of a video.

2. Description of the Related Art

While shooting video, it is preferable to use a tripod to avoid motion blur. However, tripods are not handy so people tend to shoot a video while holding their video cameras in their hands. The problem here is unintentional image blur (blur caused by hand movement) that is seen during the playback of a video shot as described above. Motion blur correction is a technology that reduces such motion blur and thereby improves the viewability of images. For example, Japanese Patent Application Laid-Open (Kokai) Publication No. 05-091396 describes a motion blur correction technology (hereinafter referred to as conventional technology) in which "video signals of an immediately preceding field and a current field are compared to determine a motion vector, and the clipping frame of an image to be outputted is moved in parallel with a direction opposite to the movement according to the motion vector, whereby motion blur is corrected".

Note that there are generally two types of motion blur correction operations. One is for "still images" and the other is for "videos". The motion blur correction in the present specification refers to the latter, or in other words, motion blur correction for videos.

FIG. 7 is a diagram showing the principle of motion blur correction. In FIG. 7, three images 1 to 3 shown in the top row are consecutive frames constituting a single video, and show the same person 4a to 4c, who is not moving, as a subject. Here, when the direction of motion blur while shooting this video is from the upper right to the lower left of the screen (refer to arrows 5 and 6) for descriptive purposes, the respective positions of the person 4a to 4c in the images 1 to 3 are shifted in an opposite direction to the motion blur. In other words, the position of the person 4b in the second image 2 shifts slightly to the upper right relative to the position of the person 4a in the first image 1, and the position of the person 4c in the third image 3 shifts further slightly to the upper right in relation to the position of the person 4b in the second image 2. Such shifts in the position of a subject appear as "blur" when the video is replayed, which is visually undesirable.

In short, in the motion blur correction of the conventional technology, the positions of the person 4a to 4c in the images 1 to 3 are aligned by a common clipping frame 7 being set in each of the images 1 to 3, and the images within the clipping frames 7 being outputted as motion blur corrected images 8 to 10.

The conventional technology is advantageous in that motion blur can be corrected during video playback. However, in the configuration of the conventional technology, motion blur correction is turned "ON" and "OFF" manually, and therefore there is a problem in that unnecessary processing is performed even when motion blur correction is not required.

That is, although frame rates for video imaging and playback commonly comply with television broadcast standards (about 30 frames per second in National Television System Committee [NTSC] standard), the imaging and playback are performed at special frame rates in the cases of, for example, high-speed imaging and slow-motion playback. During low frame-rate playback, the movement of the images is slow, and so viewability problems do not occur even when motion blur occurs to some extent. However, in the conventional technology, motion blur correction is performed even in such cases unless motion blur correction is turned "OFF" manually. Accordingly, unnecessary processing cannot be avoided, and power consumption is increased due to the processing.

In addition, motion-blur-corrected images, which are the images 8 to 10 within the clipping frame 7, are slightly smaller in size than the uncorrected images 1 to 3 (cross-hatched areas 8a to 10a surrounding the images 8 to 10 are made redundant) as shown in FIG. 7, and therefore there is a problem in that the provided imaging performance (imaging resolution) cannot be fully utilized.

SUMMARY OF THE INVENTION

In accordance with one aspect of the present invention, there is provided a motion blur correction device that performs motion blur correction on video data, comprising: a judgment section which judges necessity for motion blur correction based on a frame rate of video data; and a motion blur correction section which performs motion blur correction processing on the video data used a judgment object according to details of a judgment result by the judgment section.

In accordance with another aspect of the present invention, there is provided a motion blur correction method using a motion blur correction device, comprising: a judgment step of automatically acquiring a frame rate of video data, and automatically judging necessity for motion blur correction by the motion blur correction device based on the acquired frame rate; and a motion blur correction step of performing motion blur correction processing by the motion blur correction device on the video data used as a judgment object according to details of a judgment result by the judgment step.

In accordance with another aspect of the present invention, there is provided a non-transitory computer-readable storage medium having stored thereon a program that is executable by a computer in a motion blur correction device, the program being executable by the computer to perform functions comprising: judgment processing for automatically acquiring a frame rate of video data, and automatically judging necessity for motion blur correction based on the acquired frame rate; and correction processing for performing motion blur correction processing on the video data used as a judgment object according to a judgment result by the judgment processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a diagram of a data table showing an example of judgment conditions held in a correction criteria holding section 24;

FIG. 5 is a diagram of a data table showing another example of judgment conditions held in the correction criteria holding section 24;

FIG. 6 is a diagram of a data table showing judgment conditions based on frame rate ratio;

DETAILED DESCRIPTION OF THE PREFERRED EMBODIMENTS

The preferred embodiments of the present invention will hereinafter be described with reference to the drawings.

Figure 1:
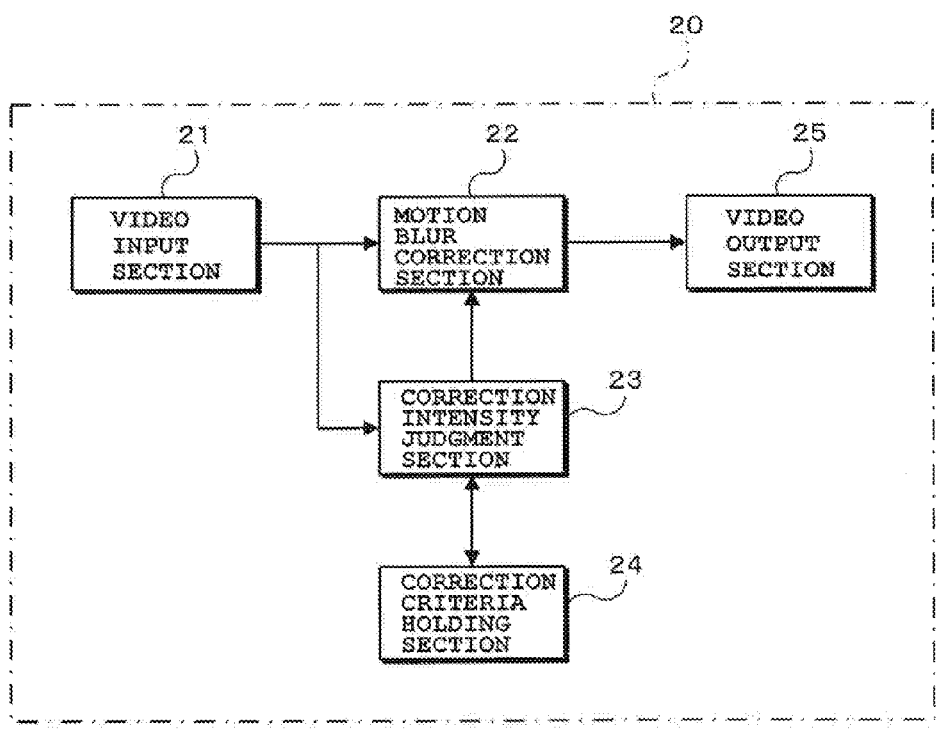
FIG. 1 is a conceptual block diagram of a motion blur correction device mounted in an imaging apparatus, such as a digital video camera or a digital camera having a video image function.

FIG. 1 is a conceptual block diagram of a motion blur correction device mounted in an imaging apparatus, such as a digital video camera or a digital camera having a video image function. A motion blur correction device 20 includes a video input section 21, a motion blur correction section 22, a correction intensity judgment section 23, a correction criteria holding section 24 and a video output section 25.

The video input section 21 loads video data generated by an imaging section (an imaging device such as a charge-coupled device [CCD] or complementary metal-oxide-semiconductor [CMOS]) of the imaging apparatus. It also loads captured video data from a storage section of the imaging apparatus or an external storage device.

The imaging section generates frame data by sequentially capturing images at a predetermined frame rate. This imaging frame rate can be randomly set by a user.

In addition, video data loaded from the storage section of the imaging apparatus or an external storage device is recorded in a format that allows the imaging frame rate to be identified by information added to the video data.

The motion blur correction section 22 performs required motion blur correction processing on video data loaded by the video input section 21.

The video output section 25 constitutes a playback section, and outputs video data on which motion blur correction has been performed as necessary by the motion blur correction section 22 to a display section of the main body of the imaging apparatus or an external display device, while video imaging in which video data is loaded by the imaging section or during video playback in which recorded video data is replayed.

During video playback in which recorded video data is replayed, the video output section 25 can use a playback frame rate randomly designated by the user which differs from an imaging frame rate used for the video data.

The motion blur correction processing that is performed by the motion blur correction section 22 is motion blur correction processing for videos. For example, the principle of the conventional technology (Japanese Patent Application Laid-Open (Kokai) Publication No. 05-091396) described earlier, that is, the principle of the technology in which "video signals of an immediately preceding field and a current field are compared to determine a motion vector, and the clipping frame of an image to be outputted is moved in parallel with a direction opposite to the movement according to the motion vector, whereby motion blur is corrected" may be used.

The correction intensity judgment section 23 judges necessity for motion blur correction based on judgment conditions held in the correction criteria holding section 24 and the frame rate of video data. This judgment is made by judging whether or not motion blur correction is required, or judging the level of necessity for motion blur correction in a plurality of stages.

This correction intensity judgment section 23 and the correction criteria holding section 24 constitute a judgment section.

The present invention differs from the conventional technology in that motion blur correction is turned "ON" and "OFF" automatically in accordance with a judgment result from the correction intensity judgment section 23, rather than merely by a user operation. That is, the present invention differs in that, when the correction intensity judgment section 23 judges that "motion blur correction is not required", the motion blur correction section 22, which has received a judgment result, sends video data received from the video input section 21 to the video output section 25 without correcting it, or when the correction intensity judgment section 23 judges that "motion blur correction is required", the motion blur correction section 22 sends video data received from the video input section 21 to the video output section 25 after performing required motion blur correction processing on the video data.

The motion blur correction section 22 receives a judgment result from the correction intensity judgment section 23, and performs motion blur correction on the judged video data according to the judgment result, or performs motion blur correction on the judged video data while changing the intensity of motion blur correction processing according to the judgment result. In the case of changing the intensity of motion blur correction processing, the motion blur correction section 22 changes the intensity of motion blur correction processing based on the level of necessity for motion blur correction judged in a plurality of stages by the correction intensity judgment section 23.

Note that, although not shown, a configuration where motion blur correction is manually turned "ON" and "OFF" may be applied here in combination with the above configuration. For example, when motion blur correction is manually turned "OFF" in this configuration, a result of judgment by the correction intensity judgment section 23 is forcibly set to "motion blur correction is not required".

The correction criteria holding section 24, which is a nonvolatile semiconductor memory such as programmable read-only memory (PROM) or read-only memory (ROM), holds judgment conditions for the correction intensity judgment section 23.

FIG. 2 is a diagram of a data table showing an example of judgment conditions held in the correction criteria holding section 24. In FIG. 2, a data table 26 has a two-dimensional table structure indicating an imaging frame rate and playback frame rates. In the example in FIG. 2, one type of imaging frame rate and six types of playback frame rates are shown. Specifically, 30 frames per second (fps; the same applies hereafter) is indicated as an imaging frame rate, and 5 fps, 10 fps, 15 fps, 30 fps, 60 fps, and 120 fps are indicated as playback frame rates. Therefore, six combinations of an imaging frame rate and a playback frame rate are provided: 30 fps and 5 fps, 30 fps and 10 fps, 30 fps and 15 fps, 30 fps and 30 fps, 30 fps and 60 fps, and 30 fps and 120 fps.

Here, the combination of 30 fps and 30 fps indicates playback performed at the same frame rate (normal speed playback). In addition, the combinations of 30 fps and 5 fps, 30 fps and 10 fps, and 30 fps and 15 fps indicate low-speed playback (slow playback) where a playback frame rate is low. Moreover, the combinations of 30 fps and 60 fps, and 30 fps and 120 fps indicate high-speed playback where a playback frame rate is high.

"ON" and "OFF" in the data table 26 indicate "motion blur correction is required" and "motion blur correction is not required", respectively. In the data table 26 in FIG. 2, "motion blur correction is not required" is indicated for the combination of 30 fps and 5 fps; "motion blur correction is required" is indicated for the combinations of 30 fps and 10 fps, 30 fps and 15 fps, and 30 fps and 30 fps; and "motion blur correction is not required" is indicated for the combinations of 30 fps and 60 fps, and 30 fps and 120 fps.

The above-described "ON" and "OFF" conditions for motion blur correction have been set based on the following idea.

First, motion blur in a video is significantly noticeable primarily during normal-speed playback (the combination of 30 fps and 30 fps), and therefore motion blur correction should be proactively performed during normal-speed playback. Accordingly, motion blur correction is set to "ON" ("motion blur correction is required") for this combination (30 fps and 30 fps).

On the other hand, motion blur is not very noticeable during low-speed playback. Particularly during playback at the lowest speed, motion blur itself is also slow, and most people are not really bothered by it. Accordingly, there is no point in performing motion blur correction in this case, and so motion blur correction is set to "OFF" ("motion blur correction is not required") for this combination (30 fps and 5 fps).

However, even during low-speed playback, motion blur may bother people in the case of combinations (30 fps and 10 fps, and 30 fps and 15 fps) that are close to normal-speed playback, although not as noticeable as that during normal-speed playback. Therefore, in the example in FIG. 2, motion blur correction is set to "ON" ("motion blur correction is required") for these combinations (30 fps and 10 fps, and 30 fps and 15 fps) as well.

The remaining combinations (high-speed playback) indicate so-called fast-forwarding, and motion blur is usually unnoticeable in these cases. Therefore, motion blur correction is set to "OFF" ("motion blur correction is not required") for these combinations (30 fps and 60 fps, and 30 fps and 120 fps).

As described above, in the data table 26 in FIG. 2, "motion blur correction is required" has been set for normal-speed playback and low-speed playback that is close to normal-speed playback, and "motion blur correction is not required" has been set for playback at the lowest speed and high-speed playback. However, this is merely an example. In other words, all that is required is that "motion blur correction is required" be set for frame-rate combinations where motion blur is noticeable during playback and "motion blur correction is not required" be set for other combinations. For example, "motion blur correction is not required" may be set for all the low-speed playback combinations (30 fps and 5 fps, 30 fps and 10 fps, and 30 fps and 15 fps), in addition to playback at the lowest speed, if required.

That is, the lower the frame rate of video data is, the lower the level of necessity for motion blur correction is judged to be by the judgment section constituted by the correction intensity judgment section 23 and the correction criteria holding section 24.

In addition, when the difference or ratio of the playback frame rate and the imaging frame rate of video data is equal to or less than a predetermined value, the judgment section judges that motion blur correction processing is not required to be performed on the targeted video data.

Moreover, when the difference or the ratio of a playback frame rate and an imaging frame rate is equal to or less than a predetermined value during low-speed playback where the playback frame rate is lower than the imaging frame rate, the judgment section judges that motion blur correction processing is not necessary (necessity is low). In addition, when the difference or the ratio of a playback frame rate and an imaging frame rate is more than the predetermined value during low-speed playback where the playback frame rate is lower than the imaging frame rate, or during normal-speed playback where the imaging frame rate and the playback frame rate are the same, the judgment section judges that motion blur correction processing is necessary (necessity is high). In high-speed playback where a playback frame rate is higher than an imaging frame rate, the judgment section judges that motion blur correction processing is not necessary (necessity is low).

Figure 3:
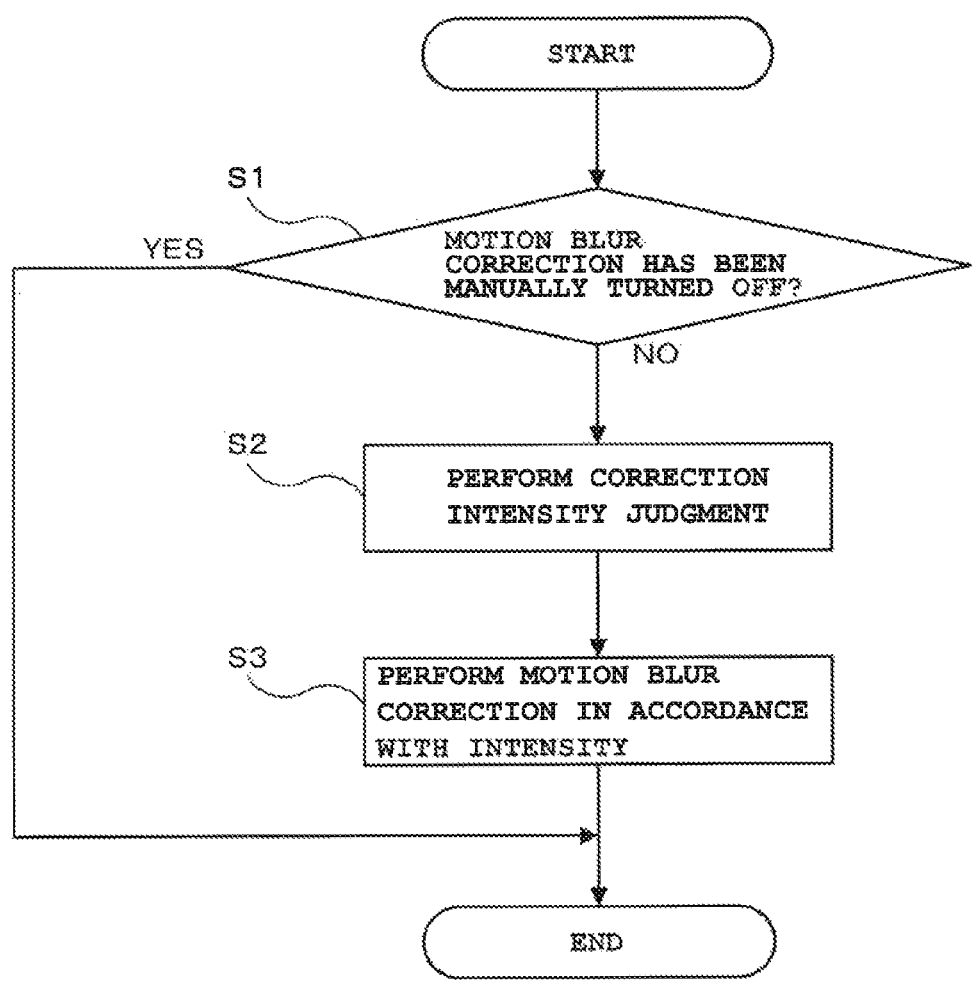
FIG. 3 is a flowchart of operations performed by a motion blur correction device 20.

FIG. 3 is a flowchart of the operations performed by the motion blur correction device 20. As shown in FIG. 3, the motion blur correction device 20 first judges whether or not motion blur correction has been manually turned "OFF", or in other words, whether or not motion blur correction has been manually set not to be performed (Step S1). When judged that motion blur correction has been manually turned "OFF", the motion blur correction device 20 immediately completes the flow. Conversely, when judged that motion blur correction has not been manually turned "OFF", or in other words, when judged that motion blur correction has not been manually set not to be performed, the motion blur correction device 20 performs the following two processing.

A first processing is the judgment of the intensity of motion blur correction (Step S2). In this intensity judgment processing, whether or not to perform motion blur correction ("ON" or "OFF") is judged based on the imaging frame rate and the playback frame rate of video data loaded by the video input section 21 and a predetermined judgment condition (refer to data table 26 in FIG. 2). In the data table 26 in FIG. 2, "ON" and "OFF" conditions are set for each combination of an imaging frame rate and a playback frame rate. "ON" indicates that "motion blur correction is required", and "OFF" indicates that "motion blur correction is not required". Although the term "ON" or "OFF" is a binary-type expression and semantically differs slightly from the term "intensity", "OFF" herein indicates a state where the effect of motion blur correction has been set to minimal, and "ON" herein indicates a state where the effect of motion blur correction has been set to maximum.

A second processing is the execution of motion blur correction (Step S3). In this motion blur correction processing, the motion blur correction device 20 selects whether to send video data loaded by the video input section 21 to the video output section 25 without correcting it or to send video data loaded by the video input section 21 to the video output section 25 after performing required motion blur correction processing on the video data, in accordance with a judgment result of the first processing (intensity judgment processing at Step S2).

The selection is exclusively dependent on the imaging frame rate and the playback frame rate of video data loaded by the video input section 21, and the setting details in the data table 26 in FIG. 2.

Here, the frame rates of video data loaded by the video input section 21 are written in "imaging frame rate/playback frame rate" format. In the data table 26 in FIG. 2, the following combinations are provided:
"30 fps/5 fps"
"30 fps/10 fps"
"30 fps/15 fps"

"30 fps/30 fps"
"30 fps/60 fps"
"30 fps/120 fps"

Additionally, in the data table 26 in FIG. 2, the following conditions regarding whether or not to perform motion blur correction are set for each combination:

"30 fps/5 fps"→OFF
"30 fps/10 fps"→ON
"30 fps/15 fps"→ON
"30 fps/30 fps"→ON
"30 fps/60 fps"→OFF
"30 fps/120 fps"→OFF According to the above-described example, an effect can be achieved in that motion blur correction is performed when the combination of the frame rates of video data loaded by the video input section 21 is any one of the following combinations:

"30 fps/10 fps"
"30 fps/15 fps"
"30 fps/30 fps"

On the other hand, motion blur correction is not performed when the combination of the frame rates is any one of the following combinations:

"30 fps/5 fps"
"30 fps/60 fps"
"30 fps/120 fps"

In the conventional technology (Japanese Patent Application Laid-Open (Kokai) Publication No. 05-91396) described earlier, whether or not to perform motion blur correction is required to be manually determined. That is, a motion blur correction switch is required to be manually turned off every time low-speed playback or high-speed playback where motion blur is not noticeable is performed, which is very inconvenient. Therefore, most of the users perform imaging and playback with the motion blur correction switch left "ON", whereby necessary processing is performed even during low-speed playback and high-speed playback where motion blur is unnoticeable. Therefore, there is also a power consumption problem that needs to be solved.

In contrast with the conventional technology, the motion blur correction device 20 of the present embodiment automatically judges whether or not to perform motion blur correction processing based on the imaging frame rate and the playback frame rate of video data loaded by the video input section 21 and the setting details in the data table 26. Therefore, unique effects are achieved in that unnecessary processing during low-speed playback and high-speed playback where motion blur is unnoticeable is prevented and power consumption can be improved thereby.

In the above-described embodiment, one type (30 fps) of imaging frame rate is provided as shown in the data table 26 in FIG. 2. However, in modern imaging apparatuses such as digital video cameras and digital cameras having a video image function, the imaging frame rate can be selected from plural types of frame rates. Accordingly, another embodiment that can be applied to such imaging apparatuses will be described hereafter.

Figure 4:
FIG. 4 is a diagram of a data table showing another example of judgment conditions held in the correction criteria holding section 24.
Figure 4:
Figure 7:
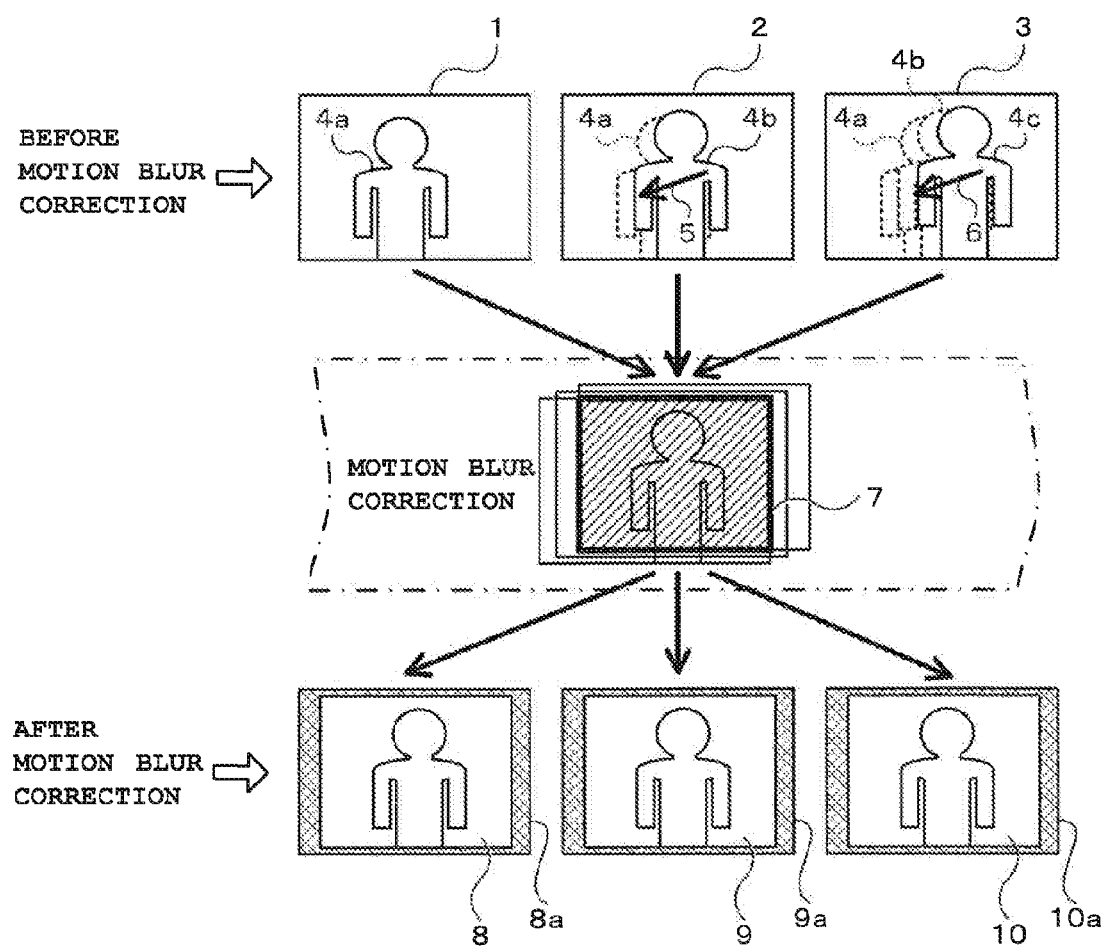
FIG. 7 is a diagram showing the principle of motion blur correction.

FIG. 4 is a diagram of a data table showing another example of judgment conditions held in the correction criteria holding section 24. In FIG. 4, a data table 27 has a two-dimensional table structure indicating imaging frame rates and playback frame rates, as in the case of the data table 26 in FIG. 2. The data table 27 differs from the data table 26 in FIG. 2 in that the type of imaging frame rate is increased from one type (30 fps) to five types (30 fps, 60 fps, 120 fps, 240 fps, and 480 fps).

Here, 30 fps is a frame rate that corresponds to the so-called NTCS standard and is a common frame rate for many imaging apparatuses. On the other hand, 60 fps, 120 fps, 240 fps, and 480 fps are respectively twice, four-times, eight-times, and sixteen-times higher than the common frame rate, and used in an imaging mode referred to as so-called high-speed imaging. The high-speed imaging refers to an imaging mode in which a video is shot using a larger number of frames than that in a normal imaging mode. When a video shot in this mode is replayed at a normal frame rate (such as 30 fps), the movement of the subject appears slow. In this regard, this playback is similar to a typical slow-motion playback (where a playback frame rate is simply reduced). However, it differs from the typical slow-motion playback in that, because the number of imaging frames is large, fine movement can be observed in detail (such as the instant a golf ball is hit).

The number of an imaging frame rate and a playback frame rate combinations in the data table 27 is a total 30 types (5×6), which are:

"30 fps/5 fps"
"30 fps/10 fps"
"30 fps/15 fps"
"30 fps/30 fps"
"30 fps/60 fps"
"30 fps/120 fps"
"60 fps/5 fps"
"60 fps/10 fps"
"60 fps/15 fps"
"60 fps/30 fps"
"60 fps/60 fps"
"60 fps/120 fps"
"120 fps/5 fps"
"120 fps/10 fps"
"120 fps/15 fps"
"120 fps/30 fps"
"120 fps/60 fps"
"120 fps/120 fps"
"240 fps/5 fps"
"240 fps/10 fps"
"240 fps/15 fps"
"240 fps/30 fps"
"240 fps/60 fps"
"240 fps/120 fps"
"480 fps/5 fps"
"480 fps/10 fps"
"480 fps/15 fps"
"480 fps/30 fps"
"480 fps/60 fps"
"480 fps/120 fps"

In addition, "ON" and "OFF" are set in the data table 27, as in the case of the data table 26 in FIG. 2. "ON" indicates "motion blur correction is required", and "OFF" indicates "motion blur correction is not required". Specifically, "ON" or "OFF" are set for each combination as follows:

"30 fps/5 fps"→OFF
"30 fps/10 fps"→ON
"30 fps/15 fps"→ON
"30 fps/30 fps"→ON
"30 fps/60 fps"→OFF
"30 fps/120 fps"→OFF
"60 fps/5 fps"→OFF
"60 fps/10 fps"→OFF
"60 fps/15 fps"→ON
"60 fps/30 fps"→ON
"60 fps/60 fps"→ON
"60 fps/120 fps"→OFF
"120 fps/5 fps"→OFF "120 fps/10 fps"→OFF
"120 fps/15 fps"→OFF
"120 fps/30 fps"→ON
"120 fps/60 fps"→ON
"120 fps/120 fps"→ON
"240 fps/5 fps"→OFF
"240 fps/10 fps"→OFF
"240 fps/15 fps"→OFF
"240 fps/30 fps"→OFF
"240 fps/60 fps"→ON
"240 fps/120 fps"→ON
"480 fps/5 fps"→OFF
"480 fps/10 fps"→OFF
"480 fps/15 fps"→OFF
"480 fps/30 fps"→OFF
"480 fps/60 fps"→OFF
"480 fps/120 fps"→ON As in the case of the data table 26 in FIG. 2, the "ON" and "OFF" conditions for motion blur correction are set such that motion blur correction is "ON" when motion blur is noticeable, and "OFF" when motion blur is not noticeable. That is, because motion blur in a video is noticeable during normal-speed playback (30 fps and 30 fps, 60 fps and 60 fps, and 120 fps and 120 fps), and motion blur correction should be pro-actively performed during this normal-speed playback, motion blur correction is set to "ON" ("motion blur correction is required") for these combinations (30 fps and 30 fps, 60 fps and 60 fps, and 120 fps and 120 fps).

On the other hand, motion blur is not very noticeable during low-speed playback. Particularly during playback at the lowest speed, motion blur itself is also slow, and most people are not really bothered by it. Accordingly, there is no point in performing motion blur correction in this case, and so motion blur correction is set to "OFF" ("motion blur correction is not required") for these combinations (30 fps and 5 fps, 60 fps and 5 fps, 60 fps and 10 fps, 120 fps and 5 fps, 120 fps and 10 fps, 120 fps and 15 fps, 240 fps and 5 fps, 240 fps and 10 fps, 240 fps and 15 fps, 240 fps and 30 fps, 480 fps and 5 fps, 480 fps and 10 fps, 480 fps and 15 fps, 480 fps and 30 fps, and 480 fps and 60 fps).

However, even during low-speed playback, motion blur may bother people in the case of combinations (30 fps and 10 fps, 30 fps and 15 fps, 60 fps and 15 fps, 60 fps and 30 fps, 120 fps and 30 fps, 120 fps and 60 fps, 240 fps and 60 fps, 240 fps and 120 fps, and 480 fps and 120 fps) that are close to normal-speed playback, although not as noticeable as that during normal-speed playback. Therefore, in the example in FIG. 4, motion blur correction is set to "ON" ("motion blur correction is required") for these combinations (30 fps and 10 fps, 30 fps and 15 fps, 60 fps and 15 fps, 60 fps and 30 fps, 120 fps and 30 fps, 120 fps and 60 fps, 240 fps and 60 fps, 240 fps and 120 fps, and 480 fps and 120 fps) as well.

The remaining combinations (high-speed playback) indicate so-called fast-forwarding, and motion blur is usually unnoticeable in these cases. Therefore, motion blur correction is set to "OFF" ("motion blur correction is not required") for these combinations (30 fps and 60 fps, 30 fps and 120 fps, and 60 fps and 120 fps).

As described above, in the data table 27 in FIG. 4, "motion blur correction is required" can be set for normal-speed playback and low-speed playback that is close to normal-speed playback, and "motion blur correction is not required" can be set for playback at the lowest speed and high-speed playback. However, this is merely an example. In other words, all that is required is that "motion blur correction is required" be set for frame-rate combinations where motion blur is noticeable during playback, and "motion blur correction is not required" be set for other combinations. For example, "motion blur correction is not required" may be set for all the low-speed playback combinations (30 fps and 5 fps, 30 fps and 10 fps, 30 fps and 15 fps, 60 fps and 5 fps, 60 fps and 10 fps, 60 fps and 15 fps, 60 fps and 30 fps, 120 fps and 5 fps, 120 fps and 10 fps, 120 fps and 15 fps, 120 fps and 30 fps, 120 fps and 60 fps, 240 fps and 5 fps, 240 fps and 10 fps, 240 fps and 15 fps, 240 fps and 30 fps, 240 fps and 60 fps, 240 fps and 120 fps, 480 fps and 5 fps, 480 fps and 10 fps, 480 fps and 15 fps, 480 fps and 30 fps, 480 fps and 60 fps, and 480 fps and 120 fps), in addition to playback at the lowest speed, if required.

As described above, in this embodiment as well, an effect can be achieved in that motion blur correction is performed when the combination of the frame rates of video data loaded by the video input section 21 is any one of the following combinations:
"30 fps/10 fps"
"30 fps/15 fps"
"30 fps/30 fps"
"60 fps/15 fps"
"60 fps/30 fps"
"60 fps/60 fps"
"120 fps/30 fps"
"120 fps/60 fps"
"120 fps/120 fps"
"240 fps/60 fps"
"240 fps/120 fps"
"480 fps/120 fps"

On the other hand, motion blur correction is not performed when the combination of the frame rates is any one of the following combinations:
"30 fps/5 fps"
"30 fps/60 fps"
"30 fps/120 fps"
"60 fps/5 fps"
"60 fps/10 fps"
"60 fps/120 fps"
"120 fps/5 fps"
"120 fps/10 fps"
"120 fps/15 fps"
"240 fps/5 fps"
"240 fps/10 fps"
"240 fps/15 fps"
"240 fps/30 fps"
"480 fps/5 fps"
"480 fps/10 fps"
"480 fps/15 fps"
"480 fps/30 fps"
"480 fps/60 fps"

Therefore, as in the case of the earlier-described embodiment, unique effects are achieved in that unnecessary processing during low-speed playback and high-speed playback where motion blur is unnoticeable is prevented and power consumption can be improved thereby.

In the description above, a binary-type aspect where motion blur correction is performed ("ON") or not performed ("OFF") has been given as an example. However, the present invention is not limited thereto and, for example, the "intensity" of motion blur correction may be changed. Note that the intensity of motion blur correction herein refers to the effect of motion blur correction.

For example, the principle of motion blur correction by the conventional technology (Japanese Patent Application Laid-Open (Kokai) Publication No. 05-091396) described earlier is that "video signals of an immediately preceding field and a current field are compared to determine a motion vector, and the clipping frame of an image to be outputted is moved in parallel with a direction opposite to the movement according to the motion vector, whereby motion blur is corrected", and if the accuracy of "comparison", "vector calculation", "parallel movement of the clipping frame", and the like in this principle are increased or reduced properly, the intensity of motion blur correction can be randomly changed. When the accuracy is reduced (i.e., when the percentage of an actual correction amount in relation to a required correction amount is reduced), the effect of motion blur correction (intensity) can be reduced. Conversely, when the accuracy is increased to its maximum (when a required correction amount and an actual correction amount are set to be the same), the effect of motion blur correction (intensity) can be maximized. In addition, when the accuracy is minimized, the effect is reduced to be equivalent to that of when motion blur correction is turned "OFF", because minimizing the accuracy is the same as turning "OFF" motion blur correction. Hereafter, the effect of motion blur correction (intensity) is expressed by percentage for descriptive purposes. 0% indicates the minimum effect (minimum intensity) and 100% indicates the maximum effect (maximum intensity). Also, 0% is equivalent to motion blur correction being turned "OFF", and 100% is equivalent to motion blur correction being turned "ON".

FIG. 5 is a diagram of a data table showing another example of judgment conditions held by the correction criteria holding section 24. In FIG. 5, a data table 28 has a two-dimensional table structure indicating imaging frame rates and playback frame rates, as in the case of the data table 27 in FIG. 4. The data table 28 differs from the data table 27 in FIG. 4 in that the intensity of motion blur correction (0% to 100%) is set rather than "ON" and "OFF" of motion blur correction.

The combinations of an imaging frame rate and a playback frame rate in the data table 27 amount to a total of 30 types (5×6), as in the case of the data table 27 in FIG. 4. The intensity of motion blur correction can be set for each combination as follows:
"30 fps/5 fps"→40%
"30 fps/10 fps"→60%
"30 fps/15 fps"→80%
"30 fps/30 fps"→100%
"30 fps/60 fps"→100%
"30 fps/120 fps"→100%
"60 fps/5 fps"→20%
"60 fps/10 fps"→40%
"60 fps/15 fps"→60%
"60 fps/30 fps"→80%
"60 fps/60 fps"→100%
"60 fps/120 fps"→100%
"120 fps/5 fps"→0%
"120 fps/10 fps"→20%
"120 fps/15 fps"→40%
"120 fps/30 fps"→60%
"120 fps/60 fps"→80%
"120 fps/120 fps"→100%
"240 fps/5 fps"→0%
"240 fps/10 fps"→0%
"240 fps/15 fps"→20%
"240 fps/30 fps"→40%
"240 fps/60 fps"→60%
"240 fps/120 fps"→80%
"480 fps/5 fps"→0%
"480 fps/10 fps"→0%
"480 fps/15 fps"→0%
"480 fps/30 fps"→20%
"480 fps/60 fps"→40%
"480 fps/120 fps"→60%

The above-described conditions for motion blur correction are set in a manner similar to those of the data table 26 in FIG. 2 and the data table 27 in FIG. 4. However, the data table 28 differs from them in that suitable intensities between 0% and 100% are set in accordance with the noticeability of motion blur, rather than a binary-type setting of "ON" and "OFF".

Specifically, the following combinations are assumed as combinations where motion blur is most noticeable (first-ranked combinations for noticeable motion blur), and motion blur correction of the maximum (first-ranked) intensity (100%) is performed for these combinations:
"30 fps/30 fps"
"30 fs/60 fps"
"30 fs/120 fps"
"60 fps/60 fps"
"60 fs/120 fps"
"120 fps/120 fps"

Also, the following combinations are assumed as the second-ranked combinations for noticeable motion blur, and motion blur correction of the second-ranked intensity (80%) is performed for these combinations:
"30 fps/15 fps"
"60 fps/30 fps"
"120 fps/60 fps"
"240 fps/120 fps"

In addition, the following combinations are assumed as the third-ranked combinations for noticeable motion blur, and motion blur correction of the third-ranked intensity (60%) is performed for these combinations:
"30 fps/10 fps"
"60 fps/15 fps"
"120 fps/30 fps"
"240 fps/60 fps"
"480 fps/120 fps"

Moreover, the following combinations are assumed as the fourth-ranked combinations for noticeable motion blur, and motion blur correction of the fourth-ranked intensity (40%) is performed for these combinations:
"30 fps/5 fps"
"60 fps/10 fps"
"120 fps/15 fps"
"240 fps/30 fps"
"480 fps/60 fps"

Furthermore, the following combinations are assumed as the fifth-ranked combinations for noticeable motion blur, and motion blur correction of the fifth-ranked intensity (20%) is performed for these combinations:
"60 fps/5 fps"
"120 fps/10 fps"
"240 fps/15 fps"
"480 fps/30 fps"

Still further, the following combinations are assumed as combinations where motion blur is unnoticeable, and the lowest intensity (0%) is set in these cases. Accordingly, motion blur correction is not performed for these combinations:
"120 fps/5 fps"
"240 fps/5 fps"
"240 fps/10 fps"
"480 fps/5 fps"
"480 fps/10 fps"
"480 fps/15 fps"

With the data table 28 in FIG. 5, a unique effect can be achieved in that motion blur correction can be performed at a suitable intensity in accordance with the noticeability of motion blur, as described above.

Note that the intensity for each combination of frame rates shown in the data table 28 in FIG. 5 is merely an example given to explain the present invention. In short, all that is required is that intensity according to the noticeability of motion blur is set. For example, a suitable value acquired by trial-and-error testing being repeatedly performed may be set.

Additionally, in the above-described embodiments, whether or not to perform motion blur correction is judged (or the intensity of motion blur correction is changed) based on the "combination" of an imaging frame rate and a playback frame rate. However, the present invention is not limited thereto. For example, this judgment may be made based on the "ratio" of an imaging frame rate and a playback frame rate.

FIG. 6 is a diagram of a data table showing judgment conditions based on frame rate ratio. In FIG. 6, a data table 29 has a two-dimensional table structure indicating frame rate ratios and the intensities of motion blur correction. Each of the frame rate ratios is "the ratio of a playback frame rate to an imaging frame rate", and six types of ratios are set in the example in FIG. 6: 10%, 20%, 30%, 50%, 100%, and 200%. The frame rate ratios 10% to 50% indicate low-speed playback, the frame rate ratio 100% indicates normal-speed playback, and the frame rate ratio 200% indicates double-speed playback (high-speed playback).

In regard to the intensity of motion blur correction, an intensity of 0% is set for the frame rate ratio 10%, an intensity of 20% is set for the frame rate ratio 20%, an intensity of 50% is set for the frame rate ratio 30%, an intensity of 80% is set for the frame rate ratio 50%, an intensity of 100% is set for the frame rate ratio 100%, and an intensity of 100% is set for the frame rate ratio 200%.

As described above, motion blur correction intensities of 0%, 20%, 50%, and 80% are respectively set for low-speed playback where a frame rate ratio is 10% to 50%, and a motion blur correction intensity of 100% is set for both normal-speed playback where a frame rate ratio is 100% and double-speed playback where a frame rate ratio is 200%.

Therefore, even with the data table 29 in FIG. 6, motion blur correction at an intensity of 0% (equivalent to when motion blur correction is turned "OFF") to 80% can be performed accordingly during low-speed playback, and motion blur correction at an intensity of 100% can be performed during normal-speed playback and double-speed playback. Accordingly, needless motion blur correction when motion blur is unnoticeable (when a frame rate ratio is 10%) can be prevented and, as a result of the frame rate ratios described above being used, a unique effect can be achieved in that any frame rate combination can be flexibly supported and the versatility can be enhanced thereby.

In the description above, digital video cameras and digital cameras having a video image function are given as specific examples to which the motion blur correction device 20 is applied. However, the motion blur correction device 20 can be applied to any handheld video imaging apparatus.

While the present invention has been described with reference to the preferred embodiments, it is intended that the invention be not limited by any of the details of the description therein but includes all the embodiments which fall within the scope of the appended claims.

What is claimed is:

1. A motion blur correction device that performs motion blur correction on video data, comprising:
 a judgment section which judges a necessity for motion blur correction based on a frame rate of the video data; and
 a motion blur correction section which performs motion blur correction processing on the video data used as a judgment object according to details of a judgment result by the judgment section;
 wherein the judgment section judges that the motion blur correction processing is not necessary to be performed on the video data used as the judgment object, when the frame rate of the video data is equal to or less than a predetermined value; and
 wherein the motion blur correction section cancels execution of the motion blur correction processing on the video data used as the judgment object, when the judgment section judges that the motion blur correction processing is not necessary to be performed.

2. A motion blur correction device that performs motion blur correction on video data, comprising:
 a judgment section which judges a necessity for motion blur correction based on a frame rate of the video data; and
 a motion blur correction section which performs motion blur correction processing on the video data used as a judgment object according to details of a judgment result by the judgment section;
 wherein the judgment section judges a level of necessity for motion blur correction in a plurality of stages, based on the frame rate of the video data;
 wherein the motion blur correction section changes an intensity of the motion blur correction processing on the video data used as the judgment object in a plurality of stages, based on the level of necessity for motion blur correction judged by the judgment section; and
 wherein the judgment section judges that the level of necessity for motion blur correction is low when the frame rate of the video data is low.

3. A motion blur correction device that performs motion blur correction on video data, comprising:
 a judgment section which judges a necessity for motion blur correction based on a frame rate of the video data; and
 a motion blur correction section which performs motion blur correction processing on the video data used as a judgment object according to details of a judgment result by the judgment section;
 wherein the judgment section judges the necessity for motion blur correction based on a difference or a ratio between an imaging frame rate and a playback frame rate of the video data;
 wherein the judgment section judges that the motion blur correction processing is not necessary to be performed on the video data used as the judgment object, when the difference or the ratio between the imaging frame rate and the playback frame rate of the video data is equal to or less than a predetermined value; and
 wherein the motion blur correction section cancels execution of the motion blur correction processing on the video data used as the judgment object, when the judgment section judges that the motion blur correction processing is not necessary to be performed.

4. The motion blur correction device according to claim 3, wherein the judgment section:
 judges that the motion blur correction processing is not necessary to be performed, when the difference or the ratio between the imaging frame rate and the playback frame rate of the video data is equal to or less than the predetermined value during low-speed playback where the playback frame rate is lower than the imaging frame rate;

judges that the motion blur correction processing is necessary to be performed, when the difference or the ratio of the imaging frame rate and the playback frame rate of the video data is more than the predetermined value during low-speed playback where the playback frame rate is lower than the imaging frame rate, or during normal-speed playback where the imaging frame rate and the playback frame rate are the same; and judges that the motion blur correction processing is not necessary to be performed in high-speed playback where the playback frame rate is higher than the imaging frame rate.

5. A video playback apparatus including the motion blur correction device according to claim 3, comprising:
a playback section which replays video data at an arbitrary frame rate.

6. A video playback apparatus including the motion blur correction device according to claim 3, comprising:
an imaging section which captures video data at an arbitrary frame rate; and
a playback section which replays the video data at an arbitrary frame rate.

7. A motion blur correction method using a motion blur correction device, comprising:
automatically acquiring a frame rate of video data, and automatically judging a necessity for motion blur correction by the motion blur correction device based on the acquired frame rate; and
performing motion blur correction processing by the motion blur correction device on the video data used as a judgment object according to details of a judgment result by the judging;
wherein the necessity for motion blur correction is judged based on a difference or a ratio between an imaging frame rate and a playback frame rate of the video data;
wherein the judging judges that the motion blur correction processing is not necessary to be performed on the video data used as the judgment object, when the difference or the ratio between the imaging frame rate and the playback frame rate of the video data is equal to or less than a predetermined value; and
wherein, when it is judged that the motion blur correction processing is not necessary to be performed, the performing of the motion blur correction processing on the video data used as the judgment object is canceled.

8. A non-transitory computer-readable storage medium having a program stored thereon that is executable by a computer in a motion blur correction device, the program being executable by the computer to perform functions comprising:
judgment processing for automatically acquiring a frame rate of video data, and automatically judging a necessity for motion blur correction based on the acquired frame rate; and
correction processing for performing motion blur correction processing on the video data used as a judgment object according to details of a judgment result by the judgment processing;
wherein the judgment processing judges the necessity for motion blur correction based on a difference or a ratio between an imaging frame rate and a playback frame rate of the video data;
wherein the judgment processing judges that the motion blur correction processing is not necessary to be performed on the video data used as the judgment object, when the difference or the ratio between the imaging frame rate and the playback frame rate of the video data is equal to or less than a predetermined value; and
wherein the correction processing cancels execution of the motion blur correction processing on the video data used as the judgment object, when the judgment processing judges that the motion blur correction processing is not necessary to be performed.

9. A motion blur correction method using a motion blur correction device, comprising:
automatically acquiring a frame rate of video data, and automatically judging a necessity for motion blur correction by the motion blur correction device based on the acquired frame rate; and
performing motion blur correction processing by the motion blur correction device on the video data used as a judgment object according to details of a judgment result by the judging;
wherein the judging judges that the motion blur correction processing is not necessary to be performed on the video data used as the judgment object, when the frame rate of the video data is equal to or less than a predetermined value; and
wherein, when it is judged that the motion blur correction processing is not necessary to be performed, the performing of the motion blur correction processing on the video data used as the judgment object is canceled.

10. A motion blur correction device that performs motion blur correction on video data, comprising:
automatically acquiring a frame rate of video data, and automatically judging a necessity for motion blur correction by the motion blur correction device based on the acquired frame rate; and
performing motion blur correction processing by the motion blur correction device on the video data used as a judgment object according to details of a judgment result by the judging;
wherein the judging judges a level of necessity for the motion blur correction in a plurality of stages, based on the frame rate of the video data;
wherein in performing the motion blur correction processing, an intensity of the motion blur correction processing on the video data used as the judgment object is changed in a plurality of stages, based on the judged level of necessity for the motion blur correction; and
wherein the judging judges that the level of necessity for motion blur correction is low when the frame rate of the video data is low.

* * * * *